US011378263B2

(12) United States Patent
Navabi et al.

(10) Patent No.: US 11,378,263 B2
(45) Date of Patent: Jul. 5, 2022

(54) HOLDERS FOR A LIGHT SOURCE

(71) Applicant: L.J. Star, Incorporated, Twinsburg, OH (US)

(72) Inventors: Aarash Navabi, Walpole, MA (US); Michael Sadaway, Norwood, MA (US)

(73) Assignee: L.J. Star, Incorporated, Twinsburg, OH (US)

(*) Notice: Subject to any disclaimer, the term of this patent is extended or adjusted under 35 U.S.C. 154(b) by 0 days.

(21) Appl. No.: 17/645,467

(22) Filed: Dec. 22, 2021

(65) Prior Publication Data

US 2022/0113010 A1   Apr. 14, 2022

Related U.S. Application Data

(60) Continuation-in-part of application No. 17/330,475, filed on May 26, 2021, now Pat. No. 11,274,814, which is a division of application No. 16/900,040, filed on Jun. 12, 2020, now Pat. No. 11,029,006.

(60) Provisional application No. 62/862,301, filed on Jun. 17, 2019.

(51) Int. Cl.
*F21V 21/088* (2006.01)
*F16B 2/22* (2006.01)
*F21V 21/26* (2006.01)
*F16M 13/02* (2006.01)

(52) U.S. Cl.
CPC .............. *F21V 21/088* (2013.01); *F16B 2/22* (2013.01); *F16M 13/022* (2013.01); *F21V 21/26* (2013.01); *F16M 2200/06* (2013.01)

(58) Field of Classification Search
CPC ............ F16B 2/20–248; F16M 13/022; F16M 2200/06–061; F21V 21/08–0885; F21V 21/26
See application file for complete search history.

(56) References Cited

U.S. PATENT DOCUMENTS

| | | | | |
|---|---|---|---|---|
| 1,774,775 | A * | 9/1930 | Weitz, Jr. | F21V 21/14 362/396 |
| 3,596,859 | A * | 8/1971 | MacDonald | F21S 4/10 248/214 |
| 5,542,636 | A * | 8/1996 | Mann | F21V 21/08 362/396 |

* cited by examiner

*Primary Examiner* — Jason M Han
(74) *Attorney, Agent, or Firm* — Edwin A. Sisson, Attorney at Law, LLC; Jeffrey J. Banyas

(57) ABSTRACT

A holder for a light source comprises a first arm connected at a first arm second end to a pivot member (300) having a pivot member central axis. The first arm has a first arm first end comprising a first clip. The first arm is configured to pivot around the pivot member central axis. The pivot member is configured to frictionally engage with the light source.

11 Claims, 5 Drawing Sheets

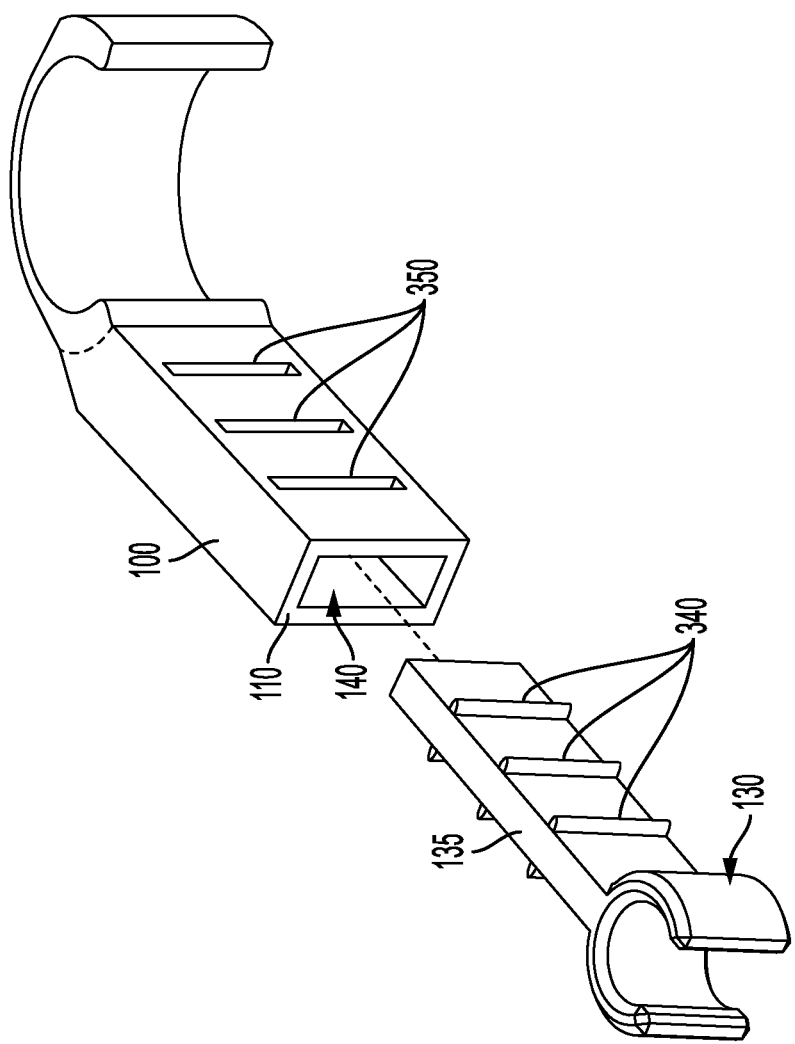

HOLDERS FOR A LIGHT SOURCE

CROSS REFERENCES AND PRIORITIES

This Application is a continuation-in-part of U.S. application Ser. No. 17/330,475 filed on 26 May 2021 which is a divisional of U.S. application Ser. No. 16/900,040 filed on 12 Jun. 2020 which claims priority from U.S. Provisional Application No. 62/862,301 filed on 17 Jun. 2019, the teachings of each of which are incorporated herein by reference in their entirety.

BACKGROUND

Equipment used in chemical, pharmaceutical, oil and gas, mining, food and beverage production, and related manufacturing industries often require visual flow indicators or sight flow indicators to allow an operator to visually observe and monitor the flowing fluid. Such devices frequently require illumination from a light source to allow the operator to see through the visual flow indicator or sight flow indicator.

This can be as simple as putting a flashlight behind a transparent pipe. The limitation of the "simple flashlight" is variable intensity and the introduction of background light and visual interference from background light.

Many solutions have been proposed for illuminating a visual flow indicator or sight flow indicator. The simplest solution is to manufacture the visual flow indicator or sight flow indicator with an integral light source. Such light sources cannot be moved to illuminate a different area, and are difficult to maintain when the light source burns out or experiences other electrical problems.

Several solutions have been proposed involving a light source which is bolted, screwed, or otherwise fastened to the visual flow indicator or the sight flow indicator by a fastener which passes through a light source mounting apparatus and into the visual flow indicator or sight flow indicator. Once fastened in place, the light source can be removed by un-fastening the light source mounting apparatus in order to repair or replace the light source, or in the event the operator needs to move the light source to a different position. This also requires that the equipment contain a series of different screw holes or other areas to which the light source mounting apparatus can be fastened as the light source is moved from one position to another.

There is therefore a need for an article that can quickly mount a light source to a visual flow indicator or sight flow indicator without the use of added bolts, screws, or other fasteners that must extend into holes that would require modifications be made to the visual flow indicator or sight flow indicator to include such holes. By eliminating the need for added bolts, screws, or other fasteners and the modifications to the visual flow indicator or sight flow indicator that are required by way of such fasteners, the light source can be easily moved from one position to another in order to illuminate different areas on the apparatus in question, or to repair or replace the light source.

SUMMARY

It is described herein a holder for a light source. The holder comprises a first arm and a pivot member. The first arm having a first arm first end and a first arm second end opposite the first arm second end, said first arm first tend comprising a first clip. The pivot member having a pivot member central axis. Said first arm second end is connected to the pivot member at a first location. The first arm is configured to pivot around the pivot member central axis. Said pivot member is configured to frictionally engage with the light source.

In some embodiments the first arm and the first clip may be made of a first single integral piece of material. In some such embodiments, the first arm and the pivot member may be made of one integral piece of material.

In certain embodiments, the first clip may be slideably connected to the first arm. In some such embodiments, the first arm and the pivot member may be made of one integral piece of material. In certain such embodiments, the first clip may comprise a first clip protrusion comprising a plurality of ribs extending from an outer surface thereof. In some such embodiments, the first arm may comprise a first arm hole comprising a plurality of slots passing through a sidewall thereof, and the plurality of ribs may be configured to interact with the plurality of slots to form a locking mechanism. In other such embodiments, the first clip may comprise a first clip sleeve having a first clip sleeve hole comprising a plurality of slots passing through a sidewall thereof. In some such embodiments, the first arm may comprise a plurality of ribs extending from an outer surface thereof, and the plurality of ribs may be configured to interact with the plurality of slots to form a locking mechanism.

The first clip may be configured to frictionally engage with a first mounting bolt of a visual flow indicator or sight flow indicator. In some embodiments, there may be only one arm.

BRIEF DESCRIPTION OF FIGURES

FIG. 5 is an exploded perspective view of the embodiment of a holder for a light source shown in FIG. 5.

DETAILED DESCRIPTION

This specification is best understood by referring to the various Figures. Reference will now be made to the various Figures in which, unless otherwise noted, like numbers refer to like structures. As described herein and in the claims, the following numbers refer to the following structures as noted in the Figures.

10 refers to a holder.
20 refers to a light source.
21 refers to a light source outside diameter.
22 refers to a lighting element
24 refers to a power connector.
40 refers to a first mounting bolt.
100 refers to a first arm.
110 refers to a first arm first end.
120 refers to a first arm second end.
130 refers to a first clip.
135 refers to a first clip protrusion.
140 refers to a first arm hole.
300 refers to a pivot member.

305 refers to a pivot member inside diameter.
310 refers to a pivot member central axis.
340 refers to a plurality of ribs.
350 refers to a plurality of slots.

Figure 1:
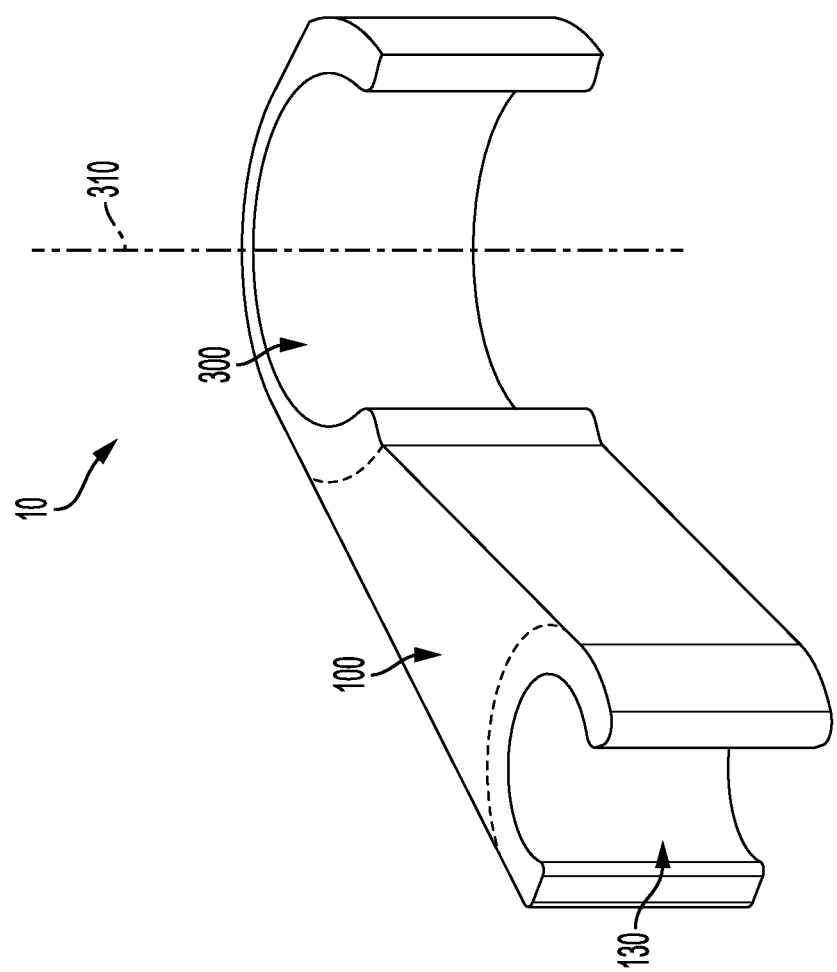
FIG. 1 is a perspective view of one embodiment of a holder for a light source.

FIG. 1 depicts a perspective view of one embodiment of a holder (10) for a light source. The embodiment of a holder comprises a first arm (100) and a pivot member (300). The first arm comprises a first clip (130). The pivot member has a pivot member central axis (310). In the embodiment in FIG. 1 there is only one arm—the first arm—and no other arm.

Figure 3:
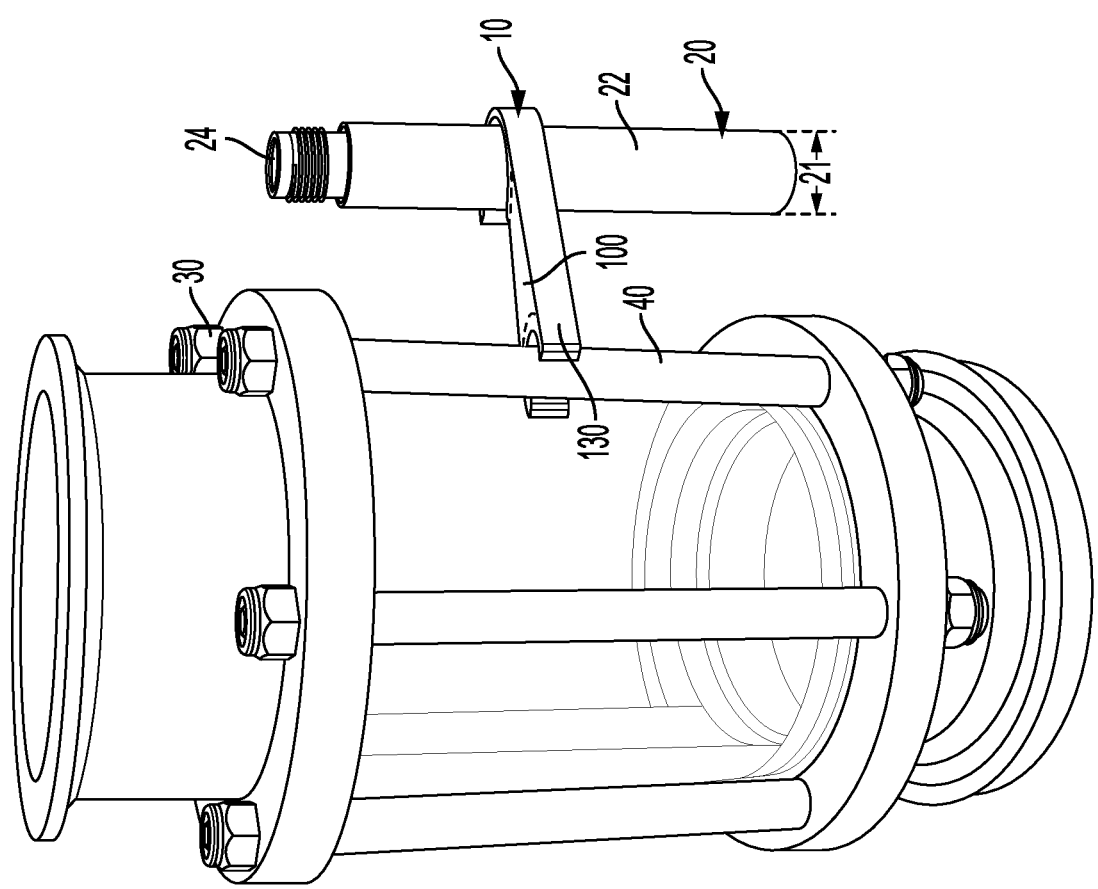
FIG. 3 is a perspective view of the embodiment of the holder for a light source shown in FIG. 1 in use holding a light source and mounted to two mounting bolts.

The light source (20 as shown in FIG. 3) may comprise a lighting element (22) attached to a power connector (24) and emit visible light and/or ultraviolet light. The lighting element may contain one or more light emitting diodes attached a metal core printed circuit board and contained within a housing. The housing may have a cross sectional profile which is circular or substantially circular having a light source outside diameter (21) Preferably the housing will be made of a transparent or translucent material. The power connector may be electrically connected to the circuit board and may configured to attach to an external power source such as a battery or a hard wire to a power grid or solar panel.

Figure 2:
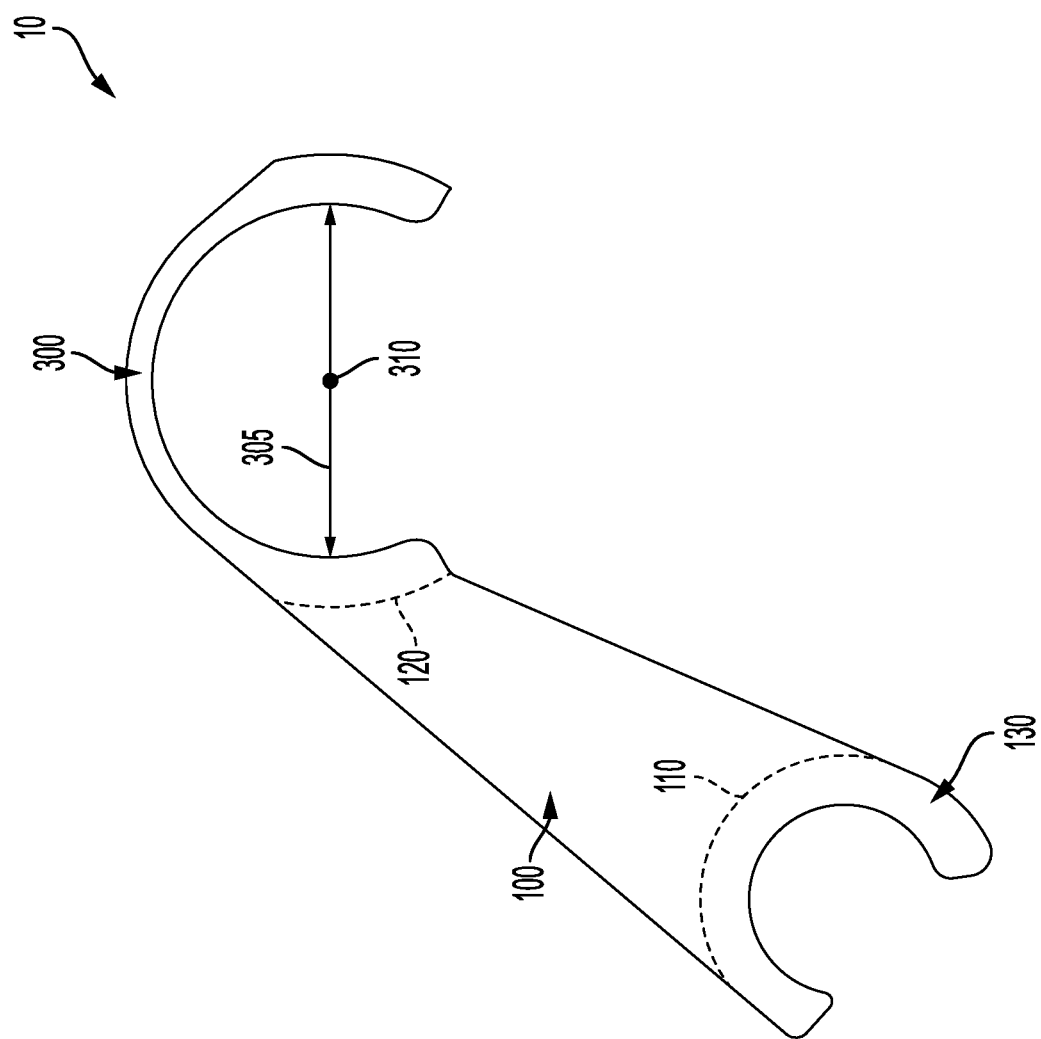
FIG. 2 is a top view of the embodiment of the holder for a light source shown in FIG. 1.

As shown in FIG. 2, which is a top view of the embodiment of a holder shown in FIG. 1, the first arm (100) has a first arm first end (110) and a first arm second end (120) opposite the first arm first end. The first arm first end comprises the first clip (130).

The first clip may be connected to the first arm first end by a variety of connection mechanisms. In some embodiments, as shown in FIG. 1 and FIG. 2, the first clip may be permanently connected to the first arm first end such as by welding the first clip to the first arm first end or by manufacturing the first clip and the first arm from one integral piece of material. Alternatively, the connection between the first clip and the first arm first end may be a slideable connection as described herein and shown in FIG. 4 and FIG. 5.

In the embodiment shown in FIG. 1 and FIG. 2, the first arm second end (120) is connected to the pivot member (300) at a first location on the outer surface of the pivot member. Preferably, the connection between the first arm second end and the pivot member is a permanent connection such as a weld or manufacturing the first arm and the pivot member from one integral piece of material.

In the embodiment shown in FIG. 1 and FIG. 2, it is preferred that the pivot member (300) be made of a flexible material allowing the pivot member to deflect and rebound as the first arm (100) pivots around the pivot member central axis (310). This provides a frictional force for engaging the pivot member with a light source (20) to hold the light source in place as shown in FIG. 3. One of ordinary skill will recognize that this frictional force is provided by deflecting the pivot member to a point where the pivot member has an inside diameter (305 as shown in FIG. 2) equal to or substantially equal to the light source outside diameter (21 as shown in FIG. 3). This frictional force prevents or at least reduces the likelihood that the light source will slip or fall from the holder due to the force of gravity or other forces applied to the light source.

As the light source (20) is being held in place, the first clip (130) frictionally engages with a first mounting bolt (40) of a visual flow indicator or sight flow indicator as shown in FIG. 3. The frictional engagement between the first clip and the mounting bolt allows the light source to be maintained in close proximity to the visual flow indicator or sight flow indicator, while also allowing for easy removal without the need to disengage bolts, nuts screws, or other fasteners.

In use, the holder (10) may be mounted at any location along the length of the light source (20) and the first mounting bolt (40). As shown in FIG. 3, the preferred location for the holder is approximately half way along the length of the light source with exactly half way along the length of the light source being more preferred.

While FIG. 3 shows the use of a single holder (10) for holding the light source (20) in place, one of ordinary skill will recognize that multiple holders may be used to hold a single light source in place. In some embodiments, the light source may be held in place by at least one holder. In other embodiments, the light source may be held in place by at least two holders. In still other embodiments, the light source may be held in place by at least three holders.

The embodiment shown in FIG. 3 shows the use of a single holder (10) which spans only a portion of the length of the first mounting bolt (40). In other embodiments, not shown, a single holder may span substantially all or all of the length of the first mounting bolt and/or the second mounting bolt.

Figure 4:
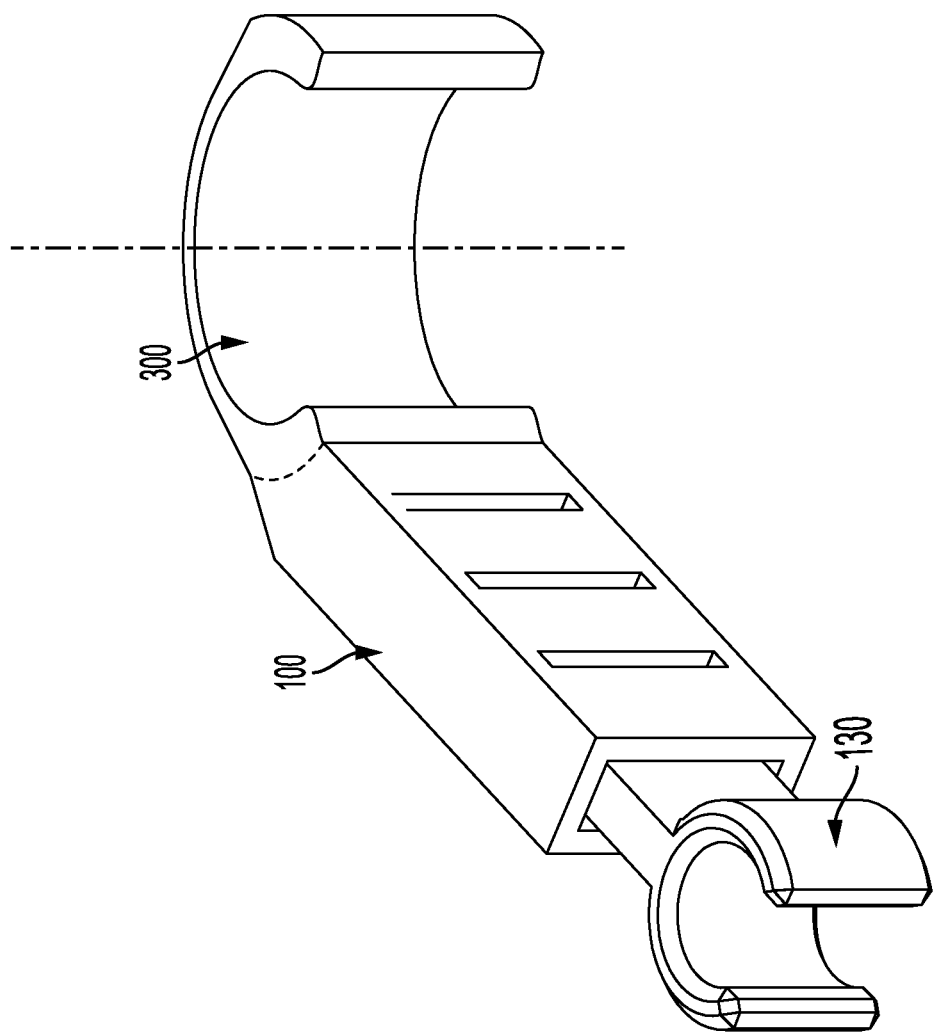
FIG. 4 is a perspective view of an alternative embodiment of a holder for a light source having a slideable engagement of the first clip to the first arm.

Another embodiment of a holder (10) for a light source (20) is shown beginning in FIG. 4. The embodiment shown in FIG. 4, which is a perspective view, comprises a first arm (100) and a pivot member (300). As shown in FIG. 4, the pivot member has a pivot member central axis (310).

FIG. 4 also shows the first arm (100) comprising a first clip (130). FIG. 4 shows the first clip being slideably engaged to the first arm as described herein.

FIG. 5, which is an exploded perspective view of the FIG. 4 embodiment, shows the first arm (100) having a first arm first end (110) and a first arm second end (120) opposite the first arm first end.

In the embodiment shown in FIG. 4 through FIG. 5, the first arm second end (120) is connected to the pivot member (300) at a first location on the pivot member outer surface. Preferably, the connection between the first arm second end and the pivot member is a permanent connections such as a weld or manufacturing the first arm and the pivot member from one integral piece of material.

FIG. 5 also shows additional details of the slideable connections between the first arm (100) and the first clip (130). As shown in FIG. 5, the first clip may comprise a first clip protrusion (135) while the first arm may comprise a first arm hole (140). The first clip protrusion preferably is of similar size and shape as the first arm hole to allow the first clip protrusion to pass into and out of the first arm hole. In some embodiments, the first arm hole will originate at the first arm first end (110) and extend all the way through the first arm to the first arm second end (120)—also known as a first arm through hole. In other embodiments, the first arm hole will be a first arm blind hole in which the first arm hole originates at the first arm first end and extends a portion of the way through the first arm without extending through to the first arm second end.

The slideable connection may or may not include a locking mechanism as shown in FIG. 5. When present, the locking mechanism(s), may include a plurality of ribs (340) extending from an outer surface of the first clip protrusion (135). The locking mechanism may also include a plurality of slots (350) passing through a sidewall of the first arm hole (140). When present, the ribs may deform as the first clip protrusion passes into the first arm hole. When the protrusion has extended into the hole to a position where a rib is aligned with a slot, the rib will return to position and extend at least partially into the slot to frictionally engage the protrusion with the hole.

One of ordinary skill will recognize that, while the embodiments shown in FIG. 4 to FIG. 5 show the clip having a protrusion and the arm having a hole, the configuration can be easily reversed. For instance, the first clip (130) may comprise a first clip sleeve having a first clip sleeve hole configured to pass over the first arm (100) from the first arm first end (110) toward the first arm second end (120).

The various embodiments of a holder described herein and shown in the drawings allow the light source to be quickly and easily mounted to a visual flow indicator or sight flow indicator by attaching the clips and/or brackets to a portion (bolts or flanges) of the visual flow indicator or sight flow indicator without having to modify the visual flow indicator or sight flow indicator to include additional holes for fasteners to pass into. The holders also allow the light source to be quickly and easily moved from one position on the visual flow indicator or sight flow indicator to another position without the need to undertake a time consuming process of removing bolts, screws or other fasteners. This allows the user to more quickly and easily illuminate different positions on the visual flow indicator or sight flow indicator.

What is claimed is:

1. A holder (10) for a light source (20) comprising:
   a first arm (100) having a first arm first end (110) and a first arm second end (120) opposite the first arm first end, said first arm first end comprising a first clip (130); and
   a pivot member (300) having a pivot member central axis (310); and wherein said first arm second end is connected to the pivot member at a first location, said first arm is configured to pivot around the pivot member central axis, said pivot member is configured to frictionally engage with the light source, and the first clip is configured to frictionally engage with a first mounting bolt (40) of a visual flow indicator or sight flow indicator.

2. The holder of claim 1, wherein there is only one arm.

3. The holder of claim 1, wherein the first arm and the first clip are made of a first single integral piece of material.

4. The holder of claim 1, wherein the first arm and the pivot member are made of one integral piece of material.

5. The holder of claim 1, wherein the first clip is slideably connected to the first arm.

6. The holder of claim 3, wherein the first arm and the pivot member are made of one integral piece of material.

7. The holder of claim 4, wherein the first clip is slideably connected to the first arm.

8. The holder of claim 5, wherein the first clip comprises a first clip protrusion comprising a plurality of ribs extending from an outer surface thereof, the first arm comprises a first arm hole comprising a plurality of slots passing through a sidewall thereof, and the plurality of ribs are configured to interact with the plurality of slots to form a locking mechanism.

9. The holder of claim 7, wherein the first clip comprises a first clip protrusion comprising a plurality of ribs extending from an outer surface thereof, the first arm comprises a first arm hole comprising a plurality of slots passing through a sidewall thereof, and the plurality of ribs are configured to interact with the plurality of slots to form a locking mechanism.

10. The holder of claim 5, wherein the first clip comprises a first clip sleeve having a first clip sleeve hole comprising a plurality of slots passing through a sidewall thereof, the first arm comprises a plurality of ribs extending from an outer surface thereof, and the plurality of ribs are configured to interact with the plurality of slots to form a locking mechanism.

11. The holder of claim 7, wherein the first clip comprises a first clip sleeve having a first clip sleeve hole comprising a plurality of slots passing through a sidewall thereof, the first arm comprises a plurality of ribs extending from an outer surface thereof, and the plurality of ribs are configured to interact with the plurality of slots to form a locking mechanism.

* * * * *